UNITED STATES PATENT OFFICE.

FRANK M. KELLOGG, OF BATTLE CREEK, MICHIGAN.

CEREAL PRODUCT AND METHOD OF MAKING.

1,145,021.  Specification of Letters Patent.  Patented July 6, 1915.

No Drawing.  Application filed September 17, 1914.  Serial No. 862,166.

*To all whom it may concern:*

Be it known that I, FRANK M. KELLOGG, a citizen of the United States, residing at Battle Creek, Michigan, have invented certain new and useful Improvements in Cereal Products and Methods of Making, of which the following is a specification.

This invention relates to improvements in cereal products.

The main objects of this invention are:—First. To provide an improved cereal alimentary product containing a considerable proportion of bran. Second. To provide an improved cereal product, consisting of gluten and bran in a light, cellular or puffed form or condition. Third. To provide an improved process of producing cereal products.

In the preferred method or process I remove the starch from wheat flour by washing or other suitable method. Into the gluten dough thus prepared I knead or mix wheat bran, preferably in the proportion of one part bran, in weight, to two parts of the dough. The mixing is preferably accomplished by kneading and running the dough mass or mixture through a "food chopper." The mixture is then divided into lumps or parts of the desired size, a satisfactory method being to divide the dough into small pellets by means of a suitable machine. The pellets tend to assume a spherical shape. The dough may be cut into thin strips or ribbons or formed into sheets or wafers if preferred. After dividing the mixture as desired, it is passed to an oven having a temperature approximating 500° Fahrenheit. This high temperature quickly expands the gluten and fixes the same in a cellular structure, the outer shell and the walls of the cells being very thin, the bran being incorporated with or carried by the thin walls. The product is passed from the first oven, which I designate as the "puffing" oven, to the baking and browning or toasting oven, heated to a lower temperature. I preferably place the dough on an endless belt and pass through a series of ovens, the "puffing" oven being the first in the series, the temperatures of the baking ovens being preferably gradually reduced. By providing a series of ovens, the endless belt may be driven continuously. By regulating the speed of the belt and the temperatures of the ovens, the product is effectively puffed or expanded to cellular form, and is thoroughly baked and browned or toasted without burning the same. Salt may be added, if desired, but I prefer the product without other ingredients. The value of bran in the dietary is well understood and the gluten serves not only as a satisfactory base or vehicle for the same, but is itself a valuable food ingredient.

The product may be coated with chocolate or other coating, if desired. It is, however, very palatable without coating and may be served with cream or fruit, and, in fact, used as is common with the so-called cereal breakfast foods.

My improved cereal food presents considerable quantities of bran in a palatable baked form, and, combined with the gluten, makes a very nutritious food, and a food well adapted for use by invalids as well as a breakfast food or as a substitute for bread or crackers.

I preferably prepare the gluten from wheat flour, although it may be prepared from other grains or cereals. I also prefer wheat bran, but the bran from other grains may be used.

Having thus described my invention, what I claim as new and desire to secure by Letters Patent is:

1. As a new article of manufacture, an alimentary product comprising cereal gluten dough and bran in the proportion of approximately one part bran, in weight, to two parts gluten dough, the bran being thoroughly incorporated with the gluten, the mixture being expanded, by heat, to a puff-like, cellular condition and baked.

2. As a new article of manufacture, an alimentary product, consisting of a mixture of cereal gluten dough and bran in the proportion of approximately one part bran, in weight, to two parts gluten dough, expanded by heat to a puff-like or cellular condition and baked.

3. As a new article of manufacture, an alimentary product, consisting of a mixture of cereal gluten dough and bran expanded by heat to a puff-like or cellular condition and baked.

4. As a new article of manufacture, an alimentary product comprising cereal gluten dough and bran, the bran being thoroughly mixed with the gluten dough, the mixture being expanded to a cellular form by heat, baked and toasted.

5. As a new article of manufacture, a baked cereal alimentary product in the form of puff-like or cellular pellets, consisting of a mixture of cereal gluten dough and bran in the proportion of approximately one part bran, in weight, to two parts gluten dough.

6. As a new article of manufacture, a baked cereal alimentary product in the form of puff-like or cellular pellets, consisting of a mixture of gluten dough and bran.

7. The method of making alimentary products, consisting of mixing gluten dough and bran in the proportion of approximately one part bran, in weight, to two parts gluten dough, dividing the mixture into pellets, expanding the pellets to a puff-like condition by subjecting to a high degree of heat, and baking.

8. The method of making alimentary products, consisting of mixing gluten dough and bran, dividing the mixture into pellets, expanding the pellets to a puff-like condition by subjecting to a high degree of heat, and baking.

9. The method of making alimentary products, consisting of mixing gluten dough and bran, expanding the mixture to a cellular condition by subjecting to a high degree of heat, and baking and toasting by passing through a series of ovens of gradually reduced temperatures.

10. The method of making alimentary products, consisting of mixing gluten dough and bran, expanding the mixture to a cellular condition and baking.

In witness whereof, I have hereunto set my hand and seal in the presence of two witnesses.

FRANK M. KELLOGG. [L. S.]

Witnesses:
PETER A. THOMPSON,
CHARLOTTE STEINHAUSER.